United States Patent
Yang

(10) Patent No.: US 12,501,366 B2
(45) Date of Patent: Dec. 16, 2025

(54) STATE CONTROL METHOD AND COMMUNICATION DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 368 days.

(21) Appl. No.: 18/012,548

(22) PCT Filed: Jun. 24, 2020

(86) PCT No.: PCT/CN2020/098265
§ 371 (c)(1),
(2) Date: Dec. 22, 2022

(87) PCT Pub. No.: WO2021/258372
PCT Pub. Date: Dec. 30, 2021

(65) Prior Publication Data
US 2023/0262607 A1    Aug. 17, 2023

(51) Int. Cl.
*H04W 52/02* (2009.01)
*H04W 76/20* (2018.01)
*H04W 92/18* (2009.01)

(52) U.S. Cl.
CPC ..... *H04W 52/028* (2013.01); *H04W 52/0232* (2013.01); *H04W 76/20* (2018.02); *H04W 92/18* (2013.01)

(58) Field of Classification Search
CPC ........... H04W 52/028; H04W 52/0232; H04W 52/0219; H04W 52/0229; H04W 52/0235; H04W 52/0216; H04W 76/20; H04W 76/15; H04W 76/28; H04W 76/14; H04W 76/23; H04W 76/27; H04W 92/18; H04W 92/10; H04L 5/0098; Y02D 30/70
See application file for complete search history.

(56) References Cited

U.S. PATENT DOCUMENTS

| | | | |
|---|---|---|---|
| 11,758,481 B2 * | 9/2023 | Ding | H04L 1/1812 370/311 |
| 2019/0357145 A1 * | 11/2019 | Lopez | H04W 52/243 |
| 2020/0037247 A1 | 1/2020 | Liao et al. | |

(Continued)

FOREIGN PATENT DOCUMENTS

| | | |
|---|---|---|
| EP | 3500028 A1 | 6/2019 |
| WO | 2017196611 A1 | 11/2017 |
| WO | 2019160353 A1 | 8/2019 |

OTHER PUBLICATIONS

International Search Report of PCT/CN2020/098265 dated Mar. 31, 2021, (4p).

(Continued)

*Primary Examiner* — Robert C Scheibel
(74) *Attorney, Agent, or Firm* — Arch & Lake LLP

(57) ABSTRACT

A method of controlling a state is provided. The method includes: in response to determining that a signal monitoring resource of a wake up signal of a sidelink is occupied, waking up in a wake up period of a discontinuous reception (DRX) cycle corresponding to the wake up signal whose signal monitoring resource is occupied. A communication device that implements the method is also disclosed.

11 Claims, 5 Drawing Sheets

(56) References Cited

U.S. PATENT DOCUMENTS

2022/0174731 A1* 6/2022 Mi .................... H04W 76/28
2023/0097552 A1* 3/2023 Freda .................. H04L 1/1848
                                                    370/329

OTHER PUBLICATIONS

Mediatek Inc., "Discussion on NR V2X interruption requirement", 3GPP TSG-RAN WG4 Meeting #92bis, R4-1910902, Chongqing, China, Oct. 18, 2019, (4p).
Intel Corporation, "DRX in sidelink", 3GPP TSG RAN WG2#97, R2-1701309, Athens, Greece, Feb. 17, 2017, (2p).
Supplementary European Search Report issued in Application No. 20942007.4, dated Mar. 22, 2024,(9p).
INOA issued in application No. 202327001396 dated Apr. 22, 2024, (7p).

* cited by examiner ative the present disclosure, the following will clearly
STATE CONTROL METHOD AND COMMUNICATION DEVICE

CROSS-REFERENCE TO RELATED APPLICATION

This application is the U.S. national phase application of International Application No. PCT/CN2020/098265, filed on Jun. 24, 2020, the entire contents of which are incorporated herein by reference for all purposes.

TECHNICAL FIELD

The present disclosure relates to a field of wireless communication technology but not limited to the field of wireless communication technology, in particular to a method and apparatus for controlling a state, a communication device and a storage medium.

BACKGROUND

In order to support direct communications between UEs, a sidelink communication mode is introduced, and an interface between UEs is PC-5.

A sender UE sends sidelink control information (SCI) on a physical sidelink control channel (PSCCH), and the SCI carries a resource position for data, a source identifier, a target identifier, and etc. After receiving the SCI, the receiver UE determines whether to receive corresponding data and which process it corresponds to according to the source identifier and the target identifier therein.

SUMMARY

According to a first aspect of the present disclosure, a method for controlling a state is provided. The method includes:

waking up within a wake up period of a discontinuous reception (DRX) cycle corresponding to a wake up signal whose signal monitoring resource is occupied, in response to determining that the signal monitoring resource of the wake up signal of a sidelink is occupied.

According to a second aspect of the embodiment of the present disclosure, a method for controlling a state is provided. The method includes:

setting a monitoring timer in a sleep period, in response to determining that a channel monitoring resource of a communication channel of the sidelink is occupied; and waking up within a timing duration of the monitoring timer, and monitoring the communication channel of the sidelink.

According to a third aspect of the present disclosure, a communication device is provided, including a processor, a transceiver, a memory and an executable program stored in the memory and capable of running by the processor. When the processor executes the executable program, the steps of method for controlling a state according to the first aspect or the second aspect are implemented.

It should be understood that the above general descriptions and following detailed descriptions are only illustrative and descriptive, and may not be a limitation in an embodiment of the disclosure.

BRIEF DESCRIPTION OF THE DRAWINGS

The drawings herein are incorporated into the specification and constitute a part of the specification, show embodiments in conformity with the present disclosure, and explain the principle in embodiments of the present disclosure together with the specification.

DETAILED DESCRIPTION

The embodiments will be described in detail here, and examples thereof are shown in the accompanying drawings. When the following descriptions are referred to the accompanying drawings, unless otherwise indicated, the same numbers in different drawings represent the same or similar elements. The implementations described in the following embodiments do not represent all the implementations consistent with the present invention. Rather, they are merely examples of the apparatus and method consistent with some aspects of the present invention as detailed in the appended claims.

The terms described in the present disclosure are only for the purpose of describing specific embodiments and are not intended to limit the embodiments of the present disclosure. The singular forms "a", "the" and "said" used in the embodiments of the present disclosure and the attached claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in the embodiments of the present disclosure to describe various information, such information shall not be limited to these terms. These terms are only used to distinguish the same type of information. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determination".

Figure 1:
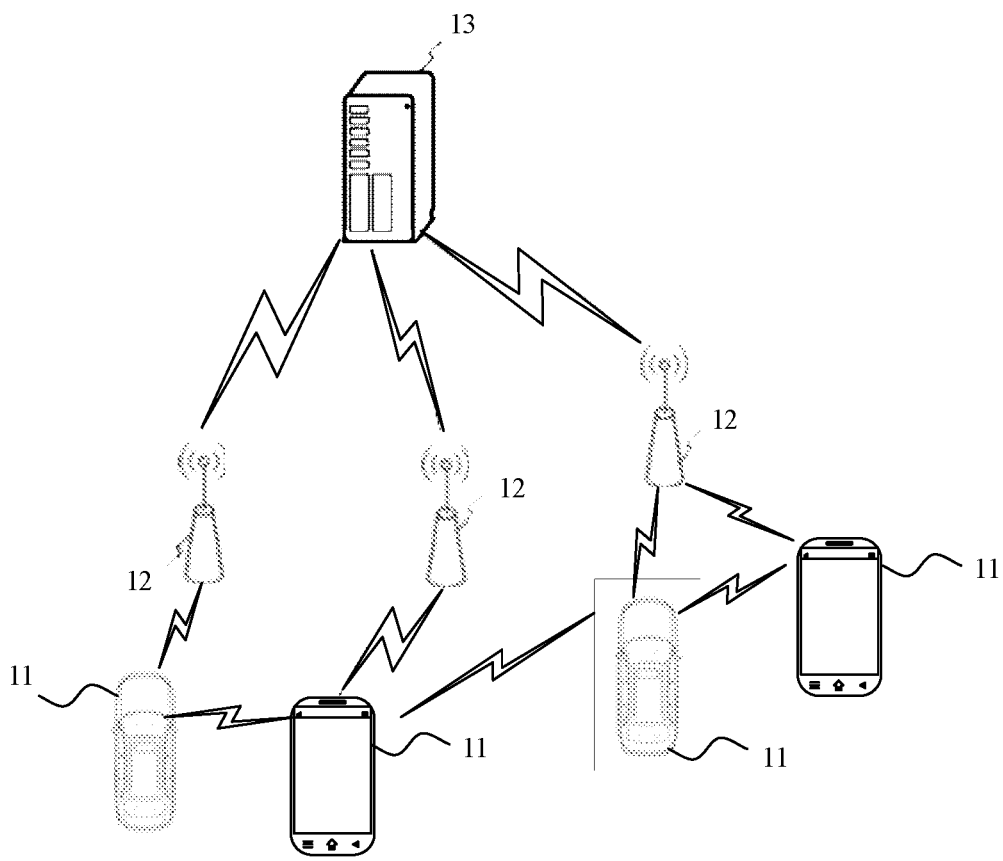
FIG. 1 is a structure diagram illustrating a wireless communication system according to an embodiment.

FIG. 1 is a diagram illustrating a wireless communication system in an embodiment of the present disclosure. As illustrated in FIG. 1, the wireless communication system is a communication system based on cellular mobile communication technology. The wireless communication system may include several terminals 11 and several base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a mobile phone (or "cellular" phone) and a computer with the IoT terminal. The terminal 11 may be a fixed, portable, pocket, hand-held, built-in computer or a vehicle-mounted device, such as, a Station (STA), a subscriber unit, a subscriber station, a mobile station, a mobile, a remote station, an access point, a remote terminal, an access terminal, a user terminal, a user agent, a user device, or a UE. Alternatively, the terminal 11 may also be an Unmanned Aerial Vehicle (UAV) device. Alternatively, the terminal 11 may also be a vehicle-mounted device, such as, an Engine Control Unit (ECU) with a wireless communication function, and a wireless communication device connected to the ECU. Alternatively, the terminal 11 may also be a roadside device, such as, a street light, a signal light, or other roadside devices with a wireless communication function.

The base station 12 may be a network-side device in a wireless communication system. The wireless communication system may be the 4th generation (4G) mobile communication system, also known as a Long Term Evolution (LTE) system. Alternatively, the wireless communication system may also be the 5th generation (5G) mobile communication system, also known as a New Radio (NR) system or 5G NR system. Alternatively, the wireless communication system may also be a next-generation system of the 5G system. The access network in the 5G system may be called New Generation-Radio Access Network (NG-RAN), or Machine Type Communication (MTC) system.

The base station 12 may be an evolved base station (eNB) in the 4G system. Alternatively, the base station 12 may also be a base station (gNB) that adopts a centralized distributed architecture in the 5G system. When the base station 12 adopts a centralized distributed architecture, it generally includes a Central Unit (CU) and at least two Distributed Units (DUs). The CU is provided with protocol stacks of a Packet Data Convergence Protocol (PDCP) layer, a Radio Link Control (RLC) layer, and a Media Access Control (MAC) layer. A physical (PHY) layer protocol stack is set in the DU, and the specific implementation manner of the base station 12 is not limited in this embodiment of the disclosure.

A wireless connection can be established between the base station 12 and the terminal 11 through a radio interface. In different embodiments, the radio interface is a radio interface based on the 4G standard. Alternatively, the radio interface is a radio interface based on the 5G standard, such as, a NR. Alternatively, the radio interface may also be a radio interface based on a next generation of the 5G standard.

In some embodiments, an End to End (E2E) connection may also be established between the terminals 11, for example, scenes of vehicle to vehicle (V2V) communication, Vehicle to Infrastructure (V2I) communication and Vehicle to Pedestrian (V2P) communication in a Vehicle to everything (V2X) communication.

In some embodiments, the above wireless communication system may further include a network management device 13.

A plurality of the base stations 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 13 is not limited in this embodiment of the disclosure.

The execution subject involved in the embodiments of the present disclosure includes, but is not limited to, the user equipment (UE) that supports a sidelink communication, and the base stations in a cellular mobile communication, etc.

On the Uu interface, in order to save a power consumption of the UE, the network may configure a discontinuous reception (DRX) for the UE, and the DRX configuration includes an inactivity timer, a wake up timer, a cycle, a start offset, and etc. The UE may only monitor a PDCCH when the inactivity timer starts and when is during a wake up period, and the UE may not monitor the PDCCH at other time, so that a power consumption is reduced. Whenever the UE receives a DCI carrying its own C-RNTI on the PDCCH, the inactivity timer is started. The UE also periodically starts the wake up timer.

In order to further reduce the power consumption of the UE, a wake up signal (WUS) is introduced. The wake up signal is used for notifying the UE whether the wake up timer needs to be started in a subsequent DRX cycle or not, so that the UE may sleep all the time in a DRX cycle without a state control, and the energy is saved.

In order to reduce the power consumption of the UE, the DRX is also introduced into the sidelink. The UE wakes up within a timing duration of the inactivity timer of the sidelink and the timing duration of the wake up timer to monitor the channel of the sidelink.

Similarly, the sidelink DRX also introduces the WUS of the sidelink, and the wake up signal of the sidelink is used for notifying the UE whether to start the wake up timer of the sidelink in the subsequent DRX cycle of the sidelink.

Since receiving resource of the sidelink and the uplink transmission resource on the Uu interface adopt a time division multiplexing (TDD) mode, the UE may not receive on the sidelink when performing a Uu uplink transmission. After the DRX and the WUS are introduced to the sidelink, the UE may perform the Uu uplink transmission on a WUS monitoring position of the sidelink or within the timing duration of the wake up timer. Therefore, receptions of the WUS and SCI of the sidelink are missed. Thus the UE may not be triggered to wake up to monitor the monitoring channel of the sidelink, which results in a data loss.

Figure 2:
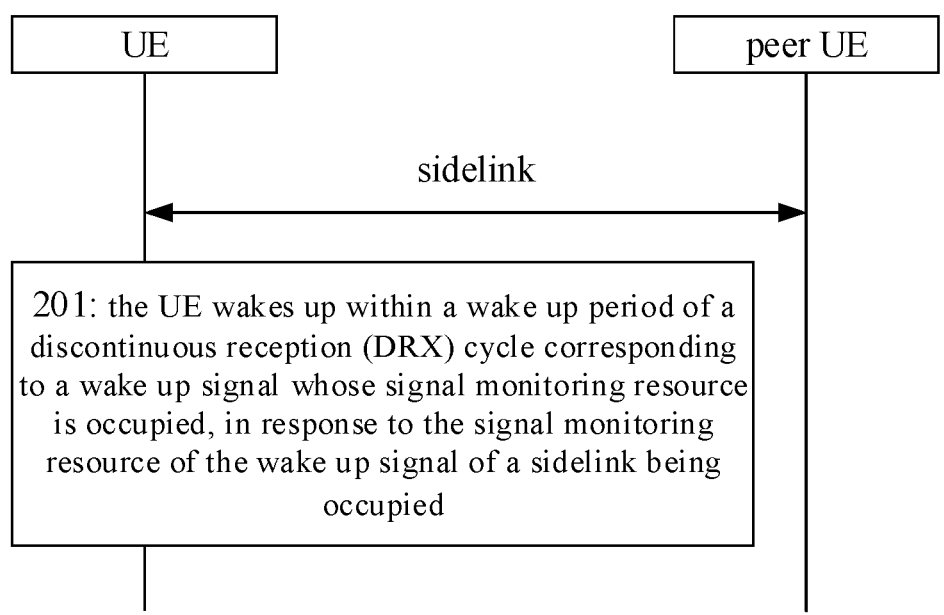
FIG. 2 is a flowchart diagram illustrating a method for controlling a state according to an embodiment.

As illustrated in FIG. 2, a method for controlling a state is provided in the embodiment of the present disclosure, which is applied to a UE of a communication system, and the method for controlling a state may include the following steps.

At block 201, the UE wakes up within a wake up period of a discontinuous reception (DRX) cycle corresponding to a wake up signal whose signal monitoring resource is occupied, in response to the signal monitoring resource of the wake up signal of a sidelink being occupied.

Here, the DRX cycle is a cycle of the DRX of the sidelink, and the wake up period is a timing duration of the wake up timer in the DRX cycle of the sidelink. The DRX cycle may include the wake up period and a sleep period.

The wake up signal is configured to notify the UE whether the UE needs to wake up in a corresponding wake up period of the DRX. If the wake up signal is not detected, the UE may maintain a sleep state within the wake up period. If the wake up signal is detected, the UE enters a wake up state within the wake up period. The UE in the wake up state may monitor a communication channel of the sidelink. The UE in the sleep period may not monitor the communication channel of the sidelink.

The communication channel of the sidelink may include a physical sidelink shared channel (PSSCH), and/or a PSCCH.

The UE may monitor the wake up signal at a preconfigured monitoring position. If the wake up signal is detected, the UE may wake up in the wake up period of a subsequent DRX cycle of the wake up signal, and monitor the communication channel of the sidelink. For example, the UE may monitor whether there is a SCI sent to itself. If the wake up signal is not detected, the UE may remain dormant within the subsequent DRX cycle, and therefore the energy is reduced.

The monitoring resource of the wake up signal may include a monitoring frequency domain resource of the wake up signal and/or a monitoring time domain resource of the wake up signal, etc.

The monitoring resource of the wake up signal being occupied may include that the monitoring resource of the wake up signal may be occupied due to other communication links which are not the sidelink, or the UE may not use the monitoring resource of the wake up signal due to the interruption of other communication time. When the monitoring resource of the wake up signal is occupied, the UE may not monitor the wake up signal sent by a peer UE of the sidelink and may not determine whether to wake up during the wake up period. If the peer UE sends the wake up signal when the monitoring resource of the wake up signal is occupied, the wake up signal may not detected by the receiver UE and the receiver UE does not wake up in the wake up period in the DRX cycle. When the peer UE sends data in the wake up period, the receiver UE may not receive the data, which results in a data loss.

The wake up signal may be used for the UE to wake up in the wake up period within one or more DRX cycles, and there is one or more wake up periods within one DRX cycle.

The wake up period corresponding to the wake up signal may be the wake up period within the DRX cycle adjacent to and after the wake up signal.

Therefore, when the monitoring resource of the wake up signal of the sidelink is occupied, the UE wakes up in the wake up period of the DRX cycle corresponding to the wake up signal. The communication channel of the sidelink is monitored in the wake up period. In this way, a problem of the data loss caused by an inability to monitor the wake up signal and an inability to wake up during the wake up period to monitor the channel may be reduced, and a reliability of data transmission may be improved.

In one embodiment, the signal monitoring resource of the wake up signal of a sidelink being occupied includes at least one of:

occupying the signal monitoring resource of the wake up signal due to an uplink transmission resource of a Uu interface;

occupying the signal monitoring resource of the wake up signal due to a bandwidth part (BWP) switching interruption; or occupying the signal monitoring resource of the wake up signal due to a measurement resource used for a wireless signal measurement.

Monitoring of the wake up signal and the uplink transmission on the Uu interface occupy the frequency-domain resource in a TDD manner. The uplink transmission resource on the Uu interface occupies the signal monitoring resource of the wake up signal, which may be part of the signal monitoring resource or all the signal monitoring resource of the wake up signal.

The duration of the uplink transmission on the Uu interface covers all or part of a monitoring duration of the wake up signal. Since the uplink transmission on the Uu interface and the monitoring of wake signal adopt a same frequency domain resource, the UE may not monitor the wake up signal, and there is a possibility of missing the wake up signal. Therefore, the UE may wake up during the on duration period of the DRX cycle corresponding to the wake up signal to perform a channel monitoring. Therefore, the problem of the data loss caused by an inability to monitor the wake up signal and an inability to wake up during the wake up period to monitor the channel may be reduced, and the reliability of data transmission may be improved.

If the UE switches from a current working BWP to another BWP, the UE needs to reconfigure radio frequency parameters, resulting in a certain radio frequency interruption period. During the radio frequency interruption period of the BWP switching, the UE may not monitor the wake up signal. The radio frequency interruption period of the BWP switching may cover all or part of the monitoring duration of the wake up signal. In the overlapping part of the radio frequency interruption period of the BWP switching and the monitoring duration of the wake up signal, the UE may not monitor the wake up signal, so it is possible to miss the wake up signal. Therefore, the UE may wake up during the on duration period of the DRX period corresponding to the wake up signal to perform the channel monitoring. Therefore, the problem of the data loss caused by an inability to monitor the wake up signal and an inability to wake up during the wake up period to monitor the channel may be reduced, and the reliability of the data transmission may be improved.

The UE will measure a wireless signal of the Uu interface. The duration of measuring the wireless signal by the UE is called a measurement interval. During the measurement interval, the UE may not receive the data signal, that is, the UE may not monitor the wake up signal. The measurement interval may cover all or part of the monitoring duration of the wake up signal. In the overlapping part of the measurement interval and the monitoring duration of the wake up signal, it is possible to miss the wake up signal. Therefore, the UE may wake up during the wake up period of the DRX period corresponding to the wake up signal to perform the channel monitoring. Therefore, the problem of the data loss caused by an inability to monitor the wake up signal and an inability to wake up during the wake up period to monitor the channel may be reduced, and the reliability of the data transmission may be improved.

In one embodiment, the UE wakes up within the wake up period of the DRX cycle corresponding to the wake up signal whose signal monitoring resource is occupied, which may include the following steps.

A first wake up timer is started in the DRX cycle corresponding to the wake up signal whose signal monitoring resource is occupied.

The UE wakes up within a timing duration of the first wake up timer.

Here, the wake up period may be the timing duration of the wake up timer in the DRX cycle, within which the UE may wake up and monitor the communication channel of the sidelink.

Figure 3:
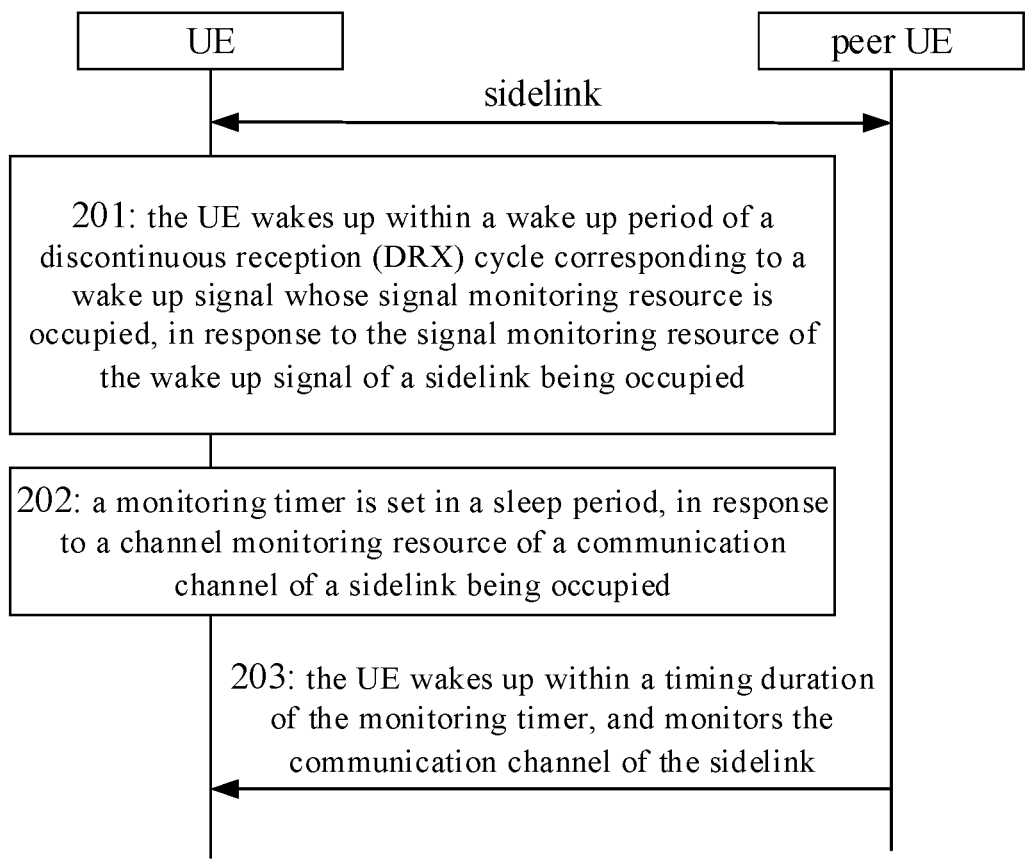
FIG. 3 is a flowchart diagram illustrating a method for controlling a state according to another embodiment.

In one embodiment, as illustrated in FIG. 3, the method further includes the following step.

At block 202, a monitoring timer is set in a sleep period, in response to a channel monitoring resource of a communication channel of a sidelink being occupied.

At block 203, the UE wakes up within a timing duration of the monitoring timer, and monitors the communication channel of the sidelink.

Here, the UE may be a data receiver UE, and the data receiver UE may monitor the communication channel of the sidelink during the wake up period. The communication channels of the sidelink may include a PSCCH and/or a PSCCH.

When the monitoring resource of the communication channel is occupied, the UE may not monitor SCI and other information sent by a peer UE of the sidelink during the wake up period, which will cause the data loss.

Since the data receiver UE may not receive the data during the wake up period, the data receiver UE will enter the sleep period after the wake up period. If a data sender UE sends data and does not receive a feedback such as an ACK and etc. from the data receiver UE during the time when the monitoring resource of the communication channel is occupied, the data will be retransmitted. Therefore, if the receiver UE enters the sleep period, the receiver UE may not receive the retransmitted data.

Here, the data receiver UE may set the monitoring timer during the sleep period, and the receiver UE may be in a wake up state within the timing duration of the monitoring timer. The timing duration of the monitoring timer may be less than or equal to the duration of the sleep period.

Thus, the UE may receive data retransmitted by the data sender UE during the sleep period. The data loss caused by the inability to receive the initial data and the retransmitted data may be reduced, and a reliability of data transmission is improved.

In one embodiment, a monitoring timer is set in the sleep period, in response to the channel monitoring resource of the communication channel of the sidelink being occupied and the method includes the follow step.

The monitoring timer is set in the sleep period, the channel monitoring resource of the communication channel of the sidelink being occupied in response to being within the timing duration of a second wake up timer located before and adjacent to the sleep period, or within the timing duration of an inactivity timer located before and adjacent to the sleep period.

Here, the wake up timer may be the wake up timer of the sidelink, and the inactivity timer may be the inactivity timer of the sidelink. Within the timing duration of the wake up timer or the timing duration of the inactivity timer, the UE wakes up and may monitor the communication channel of the sidelink. The first wake up timer and the second wake up timer may be a same timer or different timers.

The monitoring resource of the communication channel within the timing duration of the wake up timer or the monitoring resource of the communication channel within the timing duration of the inactivity timer is occupied. The UE may not monitor the SCI and other information sent by the peer UE of the sidelink, which may cause the data loss. Since the UE may not receive the data, the UE will enter the sleep period after the wake up timer times out or the inactivity timer times out.

If the data sender UE sends the data and does not receive the feedback such as ACK and etc. from the data receiver UE during the time when the monitoring resource of the communication channel is occupied, the data will be retransmitted. Therefore, if the data receiver UE enters the sleep period, the receiver UE may not receive the retransmitted data.

Here, the data receiver UE may set the monitoring timer during the sleep period, and the data receiver UE may be in a wake up state within the timing duration of the monitoring timer. The timing duration of the monitoring timer may be less than or equal to the duration of the sleep period.

Thus, the UE may receive data retransmitted by the data sender UE during the sleep period. The data loss caused by the inability to receive the initial data and the retransmitted data may be reduced, and the reliability of the data transmission is improved.

In one embodiment, the channel monitoring resource of the communication channel of the sidelink is occupied within the timing duration of the second wake up timer located before and adjacent to the sleep period, or within the timing duration of the inactivity timer located before and adjacent to the sleep period and the method includes the following steps.

All the channel monitoring resource or part of the channel monitoring resource within the timing duration of the second wake up timer is occupied due to an uplink transmission on a Uu interface or a wireless signal measurement.

In one embodiment, the channel monitoring resource of the communication channel of the sidelink is occupied within the timing duration of the second wake up timer located before and adjacent to the sleep period, or within the timing duration of the inactivity timer located before and adjacent to the sleep period and the method includes the following steps.

All the channel monitoring resource or part of the channel monitoring resource within the timing duration of the inactivity timer is occupied due to the uplink transmission on the Uu interface or the wireless signal measurement.

Monitoring of the communication channel and the uplink transmission on the Uu interface occupy the frequency domain resource in a TDD manner. During the uplink transmission on the Uu interface, the UE may not monitor the communication channel.

When a time domain position of the uplink transmission on the Uu interface and the time domain position of the wake up timer are all or partially overlapped, the UE may not monitor the communication channel within the overlapped duration.

When the time domain position of the uplink transmission of Uu interface completely or partially overlaps with the time domain position of the timing duration of the inactivity timer, the UE is unable to monitor the communication channel within the overlap duration.

Therefore, if the UE performs the uplink transmission on the Uu interface within the timing duration of the wake up timer or the timing duration of the inactivity timer, the monitoring timer may be set within the sleep period after the wake up timer or the inactivity timer times out. The communication channel of the sidelink may be monitored within the timing duration of the monitoring timer. Thus, the data retransmitted by the data sender UE may be received. The data loss caused by the inability to receive the initial data and the retransmitted data may be reduced, and the reliability of controlling a state is improved.

The duration of measuring the wireless signal by the UE is called a measurement interval. During the measurement interval, the UE may not receive the data signal, that is, the UE may not monitor the communication channel of the sidelink.

When the measurement interval and the time domain position of the wake up timer are completely or partially overlapped, the UE may not monitor the communication channel within the overlapped duration.

When the measurement interval and the time domain position of the timing duration of the inactivity timer are completely or partially overlapped, the UE is unable to monitor the communication channel within the overlap duration.

Therefore, if the UE performs a wireless signal measurement within the timing duration of the wake up timer or the timing duration of the inactivity timer, the monitoring timer may be set within the sleep period after the wake up timer or the inactivity timer times out. The communication channel of the sidelink may be monitored within the timing duration of the monitoring timer. Thus, the data retransmitted by the data sender UE may be received. The data loss caused by the inability to receive the initial data and the retransmitted data may be reduced, and the reliability of controlling the state is improved.

In one embodiment, part of the channel monitoring resource within the timing duration of the second wake up timer is occupied due to the uplink transmission on the Uu interface or the wireless signal measurement and the method includes the following steps.

The channel monitoring resource within a first duration before a timing end moment of the second wake up timer is occupied due to the uplink transmission on the Uu interface or the wireless signal measurement.

In one embodiment, part of the channel monitoring resource within the timing duration of the second wake up timer is occupied due to the uplink transmission on the Uu interface or the wireless signal measurement and the method includes the following step.

The channel monitoring resource with a time domain width in the timing duration of the second wake up timer is occupied due to the uplink transmission on the Uu interface or the wireless signal measurement. A proportion of the time domain width to the timing duration of the second wake up timer is greater than a proportional threshold.

In one embodiment, part of the channel monitoring resource within the timing duration of the inactivity timer is occupied due to the uplink transmission on the Uu interface or the wireless signal measurement and the method includes the following step.

The channel monitoring resource within the first duration before the timing end moment of the inactivity timer up timer is occupied due to the uplink transmission on the Uu interface or the wireless signal measurement.

In one embodiment, part of the channel monitoring resource within the timing duration of the inactivity timer is occupied due to the uplink transmission on the Uu interface or the wireless signal measurement and the method includes the following step.

The channel monitoring resource with a time domain width in the timing duration of the inactivity timer is occupied due to the uplink transmission on the Uu interface or the wireless signal measurement. The proportion of the time domain width to the timing duration of the inactivity timer is greater than a proportional threshold.

If the UE performs the uplink transmission on the Uu interface or the wireless signal measurement within the first duration before the wake up timer or the inactivity timer times out, the UE may not monitor the communication channel of the sidelink. The UE may set the monitoring timer within the sleep period after the wake up timer times out or within the sleep period after the inactivity timer times out. The first duration may be determined based on the duration of the data transmission of the sidelink. For example, the first duration may be greater than the duration of data transmission of the sidelink.

The UE performs the uplink transmission on the Uu interface or is in the measurement interval within the operation of the wake up timer or the inactivity timer, the proportion of which to the wake up duration exceeds a proportion threshold, and the probability of missing data is large. The UE may set the monitoring timer at the sleep period after the wake up timer times out or the sleep period after the inactivity timer times out. The proportion threshold may be determined based on a proportion of the duration of data transmission on the sidelink to the wake up duration. For example, the proportion threshold may be greater than the proportion of the duration of data transmission of the sidelink to the wake up duration.

Thus, the data retransmitted by the data sender UE may be received during the sleep period. The data loss caused by the inability to receive the initial data and the retransmitted data may be reduced, and the reliability of the data transmission is improved.

In one embodiment, the method further includes at least one of:

a radio resource control (RRC) signaling of the Uu interface carrying indication information indicating the first duration is received;

a RRC signaling of the sidelink carrying indication information indicating the first duration is received;

the RRC signaling of the Uu interface carrying indication information indicating the proportion threshold is received; or the RRC signaling of the sidelink carrying indication information indicating the proportion threshold is received.

Here, the first duration or the proportion threshold may be sent by the peer UE via the RRC signaling of the sidelink.

The first duration or the proportion threshold may also be configured by the base station and sent via the RRC signaling of the Uu interface.

Here, the first duration or the proportion threshold may be carried by an existing RRC signaling of the sidelink or the RRC signaling of the Uu interface. For example, a reserved bit of the existing RRC signaling of the sidelink or the RRC signaling of the Uu interface carries the first duration or the proportion threshold. Therefore, the information amount carried by the RRC signaling of the sidelink or the RRC signaling of the Uu interface may be increased, and the efficiency of the RRC signaling of the sidelink or the RRC signaling of the Uu interface is improved. A RRC signaling of the sidelink or a RRC signaling of the Uu interface may also be added to carry the first duration or the proportion threshold.

In one embodiment, the monitoring timer includes the inactivity timer.

The monitoring timer may also use the inactivity timer. A timer different from existing timers may also be added in the sleep period, so that the UE may wake up in the sleep period and may monitor the communication channel.

In one embodiment, the RRC signaling of the Uu interface carrying an indication indicating a configuration for the monitoring timer is received.

The RRC signaling of the sidelink carrying the indication indicating the configuration for the monitoring timer is received.

The monitoring timer may be configured by the peer UE, the configuration of which may be sent by the peer UE via the RRC signaling of the sidelink. The monitoring timer may also be configured by the base station, and the configuration of the monitoring timer may be sent via the RRC signaling of the Uu interface.

Here, the configuration of the monitoring timer may be carried in the existing RRC signaling of the sidelink or the RRC signaling of the Uu interface. For example, the reserved bit of the existing RRC signaling of the sidelink or the RRC signaling of the Uu interface carries the first duration or the proportion threshold. Therefore, the information amount carried by the RRC signaling of the sidelink or the RRC signaling of the Uu interface may be increased, and the efficiency of the RRC signaling of the sidelink or the RRC signaling of the Uu interface is improved. A RRC signaling of the sidelink or a RRC signaling of the Uu interface may also be added to carry the configuration of the monitoring timer.

In one embodiment, a monitoring timer is set in a sleep period and the method includes the following step.

The monitoring timer is set at the start moment of the sleep period.

The monitoring timer is set at the start moment of the sleep period.

Here, the monitoring timer may be set at the starting moment of the sleep period, so that the UE may wake up at the starting moment of the sleep period, may monitor the communication channel, and the case of the data loss is reduced.

Figure 4:
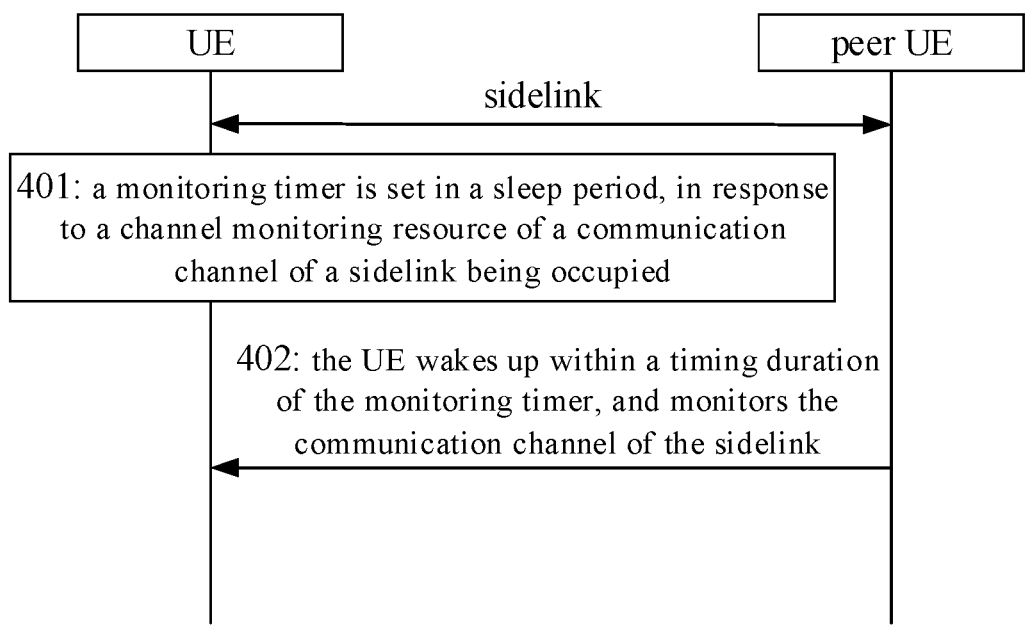
FIG. 4 is a flowchart diagram illustrating a method for controlling a state according to another embodiment.

As illustrated in FIG. 4, a method for controlling a state is provided in the embodiment of the present disclosure, which is applied to a UE of a communication system, and the method for controlling a state may include the following steps.

At block 401, a monitoring timer is set in a sleep period, in response to a channel monitoring resource of a communication channel of a sidelink being occupied.

At block 402, the UE wakes up within a timing duration of the monitoring timer, and monitors the communication channel of the sidelink.

Here, the UE may be a data receiver UE, and the data receiver UE may monitor the communication channel of the sidelink during a wake up period. The communication channels of the sidelink may include a PSCCH and/or a PSCCH.

When the monitoring resource of the communication channel is occupied, the UE may not monitor the SCI and other information sent by a peer UE of the sidelink during the wake up period, which will cause the data loss.

Since the data receiver UE may not receive data during the wake up period, the data receiver UE will enter the sleep period after the wake up period ends. If a data sender UE sends data and does not receive a feedback such as ACK and etc. from the data receiver UE during the time when the monitoring resource of the communication channel is occupied, the data will be retransmitted. Therefore, if the data receiver UE enters the sleep period, the data receiver UE may not receive the retransmitted data.

Here, the data receiver UE may set the monitoring timer during the sleep period, and the receiver UE may be in a wake up state within the timing duration of the monitoring timer. The timing duration of the monitoring timer may be less than or equal to the duration of the sleep period.

Thus, the UE may receive data retransmitted by the data sender UE during the sleep period. The data loss caused by the inability to receive the initial data and the retransmitted data may be reduced, and the reliability of data transmission is improved.

In one embodiment, the monitoring timer is set in the sleep period, in response to the channel monitoring resource of the communication channel of the sidelink being occupied and the method includes the following step.

The monitoring timer is set in the sleep period, the channel monitoring resource of the communication channel of the sidelink being occupied in response to being within the timing duration of a first wake up timer located before and adjacent to the sleep period, or within the timing duration of an inactivity timer located before and adjacent to the sleep period.

Here, the wake up timer may be the wake up timer of the sidelink, and the inactivity timer may be the inactivity timer of the sidelink. Within the timing duration of the wake up timer or the timing duration of the inactivity timer, the UE wakes up and may monitor the communication channel of the sidelink.

The monitoring resource of the communication channel within the timing duration of the wake up timer or the monitoring resource of the communication channel within the timing duration of the inactivity timer is occupied. The UE may not monitor the SCI and other information sent by the peer UE of the sidelink, which may cause the data loss. Since the UE may not receive the data, the UE will enter the sleep period after the wake up timer times out or the inactivity timer times out.

If a data sender UE sends the data and does not receive a feedback such as ACK or etc. from the data receiver UE during the time when the monitoring resource of the communication channel is occupied, the data will be retransmitted. Therefore, if the receiver UE enters the sleep period, the receiver UE may not receive the retransmitted data.

Here, the data receiver UE may set the monitoring timer in the sleep period, and the data receiver UE may be in a wake up state within the timing duration of the monitoring timer. The timing duration of the monitoring timer may be less than or equal to the duration of the sleep period.

Thus, the UE may receive data retransmitted by the data sender UE during the sleep period. The data loss caused by the inability to receive the initial data and the retransmitted data may be reduced, and the reliability of the data transmission is improved.

In one embodiment, the channel monitoring resource of the communication channel of the sidelink is occupied in response to being within the timing duration of the first wake up timer located before and adjacent to the sleep period, or within the timing duration of the inactivity timer located before and adjacent to the sleep period and the method includes the following step.

All the channel monitoring resource or part of the channel monitoring resource within the timing duration of the first wake up timer is occupied due to an uplink transmission on a Uu interface or a wireless signal measurement.

In one embodiment, the channel monitoring resource of the communication channel of the sidelink being occupied in response to being within the timing duration of the first wake up timer located before and adjacent to the sleep period, or within the timing duration of the inactivity timer located before and adjacent to the sleep period and the method includes the following step.

All the channel monitoring resource or part of the channel monitoring resource within the timing duration of the inactivity timer is occupied due to the uplink transmission on the Uu interface or the wireless signal measurement.

Monitoring of the communication channel and the uplink transmission on the Uu interface occupy the frequency domain resource in a TDD manner. During the uplink transmission on the Uu interface, the UE may not monitor the communication channel.

When the time domain position of the uplink transmission on the Uu interface and the time domain position of the wake up timer are completely or partially overlapped, the UE may not monitor the communication channel within the overlapped duration.

When the time domain position of the uplink transmission of Uu interface completely or partially overlaps with the time domain position of the timing duration of the inactivity timer, the UE is unable to monitor the communication channel within the overlap duration.

Therefore, if the UE performs the uplink transmission on the Uu interface within the timing duration of the wake up timer or the timing duration of the inactivity timer, the monitoring timer may be set within the sleep period after the wake up timer or the inactivity timer times out. The communication channel of the sidelink may be monitored within the timing duration of the monitoring timer. Thus, the data retransmitted by the data sender UE may be received. The data loss caused by the inability to receive the initial data and the retransmitted data may be reduced, and the reliability of controlling a state is improved.

The duration of measuring the wireless signal by the UE is called a measurement interval. During the measurement interval, the UE may not receive the data signal, that is, the UE may not monitor the communication channel of the sidelink.

When the measurement interval and the time domain position of the wake up timer are completely or partially overlapped, the UE may not monitor the communication channel within the overlapped duration.

When the measurement interval and the time domain position of the timing duration of the inactivity timer are completely or partially overlapped, the UE is unable to monitor the communication channel within the overlap duration.

Therefore, if the UE performs a wireless signal measurement within the timing duration of the wake up timer or the timing duration of the inactivity timer, the monitoring timer may be set in the sleep period after the wake up timer or the inactivity timer times out. The communication channel of the sidelink may be monitored within the timing duration of the monitoring timer. Thus, the data retransmitted by the data sender UE may be received. The data loss caused by the inability to receive the initial data and the retransmitted data may be reduced, and the reliability of controlling the state is improved.

In one embodiment, part of the channel monitoring resource within the timing duration of the first wake up timer is occupied due to the uplink transmission on the Uu interface or the wireless signal measurement and the method includes the following step.

The channel monitoring resource within a first duration before a timing end moment of the first wake up timer is occupied due to the uplink transmission on the Uu interface or the wireless signal measurement.

In one embodiment, part of the channel monitoring resource within the timing duration of the first wake up timer is occupied due to the uplink transmission on the Uu interface or the wireless signal measurement and the method includes the following step.

The channel monitoring resource with a time domain width in the timing duration of the first wake up timer is occupied due to the uplink transmission on the Uu interface or the wireless signal measurement. A proportion of the time domain width to the timing duration of the first wake up timer is greater than a proportional threshold.

In one embodiment, part of the channel monitoring resource within the timing duration of the first wake up timer is occupied due to the uplink transmission on the Uu interface or the wireless signal measurement and the method includes the following step.

The channel monitoring resource within the first duration before the timing end moment of the inactivity timer is occupied due to the uplink transmission on the Uu interface or the wireless signal measurement.

In one embodiment, part of the channel monitoring resource within the timing duration of the first wake up timer is occupied due to the uplink transmission on the Uu interface or the wireless signal measurement and the method includes the following step.

The channel monitoring resource with the time domain width in the timing duration of the inactivity timer is occupied due to the uplink transmission on the Uu interface or the wireless signal measurement. The proportion of the time domain width to the timing duration of the inactivity timer is greater than a proportional threshold.

If the UE performs the uplink transmission on the Uu interface or the wireless signal measurement within the first duration before the wake up timer or the inactivity timer times out, the UE may not monitor the communication channel of the sidelink. The UE may set the monitoring timer in the sleep period after the wake up timer times out or the sleep period after the inactivity timer times out. The first duration may be determined based on the duration of the data transmission of the sidelink. For example, the first duration may be greater than the duration of data transmission of the sidelink.

The UE performs the uplink transmission of the Uu interface or is in the measurement interval within the operation of the wake up timer or the inactivity timer, the proportion of which to the wake up duration exceeds a proportion threshold, and the probability of missing data is large. The UE may set the monitoring timer at the sleep period after the wake up timer times out or the sleep period after the inactivity timer times out. The proportion threshold may be determined based on the proportion of the duration of data transmission of the sidelink to the wake up duration. For example, the proportion threshold may be greater than the proportion of the duration of data transmission of the sidelink to the wake up duration.

Thus, the data retransmitted by the data sender UE may be received during the sleep period. The data loss caused by the inability to receive the initial data and the retransmitted data may be reduced, and the reliability of the data transmission is improved.

In one embodiment, the method further includes at least one of:

a radio resource control (RRC) signaling of the Uu interface carrying indication information indicating the first duration is received;

a RRC signaling of the sidelink carrying indication information indicating the first duration is received;

the RRC signaling of the Uu interface carrying indication information indicating the proportion threshold is received; or the RRC signaling of the sidelink carrying indication information indicating the proportion threshold is received.

Here, the first duration or the proportion threshold may be sent by the peer UE via the RRC signaling of the sidelink.

The first duration or the proportion threshold may also be configured by the base station and sent via the RRC signaling of the Uu interface.

Here, the first duration or the proportion threshold may be carried by an existing RRC signaling of the sidelink or the RRC signaling of the Uu interface. For example, a reserved bit of the existing RRC signaling of the sidelink or the RRC signaling of the Uu interface carries the first duration or the proportion threshold. Therefore, the information amount carried by the RRC signaling of the sidelink or the RRC signaling of the Uu interface may be increased, and an efficiency of the RRC signaling of the sidelink or the RRC signaling of the Uu interface is improved. A RRC signaling of the sidelink or a RRC signaling of the Uu interface may also be added to carry the first duration or the proportion threshold.

In one embodiment, the monitoring timer includes the inactivity timer.

The monitoring timer may also use the inactivity timer. A timer different from existing timers may also be added in the sleep period, so that the UE may wake up in the sleep period and may monitor the communication channel.

In one embodiment, the method further includes at least one of:

the RRC signaling of the Uu interface carrying an indication indicating a configuration for the monitoring timer is received; or the RRC signaling of the sidelink carrying the indication indicating the configuration for the monitoring timer is received.

The monitoring timer may be configured by the peer UE, which may be sent by the peer UE via the RRC signaling of the sidelink. The monitoring timer may also be configured by the base station, and the configuration of the monitoring timer may be sent via the RRC signaling of the Uu interface.

Here, the configuration of the monitoring timer may be carried in the existing RRC signaling of the sidelink or the RRC signaling of the Uu interface. For example, the reserved bit of the existing RRC signaling of the sidelink or the RRC signaling of the Uu interface carries the first duration or the proportion threshold. Therefore, the information amount carried by the RRC signaling of the sidelink or the RRC signaling of the Uu interface may be increased, and the efficiency of the RRC signaling of the sidelink or the RRC signaling of the Uu interface is improved. A RRC signaling of the sidelink or a RRC signaling of the Uu interface may also be added to carry the configuration of the monitoring timer.

In one embodiment, the monitoring timer is set in the sleep period and the method includes the following step.

The monitoring timer is set at the starting moment of the sleep period.

Here, the monitoring timer may be set at the starting moment of the sleep period, so that the UE may wake up at the starting moment of the sleep period, may monitor the communication channel, and the case of data loss is reduced.

In one embodiment, the method further includes the following step.

The UE wakes up within the wake up period of a discontinuous reception (DRX) cycle corresponding to the wake up signal whose signal monitoring resource is occupied, in response to the signal monitoring resource of the wake up signal of the sidelink being occupied.

Here, the DRX cycle is a cycle of the DRX of the sidelink, and the wake up period is the timing duration of the wake up timer in the DRX cycle of the sidelink. The DRX cycle may include the wake up period and the sleep period.

The wake up signal is configured to notify the UE whether the UE needs to wake up in a corresponding wake up period of the DRX. If the wake up signal is not detected, the UE may maintain a sleep state within the wake up period. If the wake up signal is detected, the UE enters a wake up state within the wake up period. The UE in the wake up state may monitor the communication channel of the sidelink. The UE in the sleep period may not monitor the communication channel of the sidelink.

The communication channel of the sidelink may include a physical sidelink shared channel (PSSCH), and/or a PSCCH.

The UE may monitor the wake up signal at a pre-configured monitoring position. If the wake up signal is detected, the UE may wake up in the wake up period of a subsequent DRX cycle of the wake up signal, and monitor the communication channel of the sidelink. For example, the UE may monitor whether there is a SCI sent to itself. If the wake up signal is not detected, the UE may remain dormant within the subsequent DRX cycle, and therefore the energy is reduced.

The monitoring resource of the wake up signal may include a monitoring frequency domain resource of the wake up signal and/or a monitoring time domain resource of the wake up signal, etc.

The monitoring resource of the wake up signal being occupied may include that the monitoring resource of the wake up signal may be occupied due to other communication links which are not the sidelink, or the UE may not use the monitoring resource of the wake up signal due to the interruption of other communication time. When the monitoring resource of the wake up signal is occupied, the UE may not monitor the wake up signal sent by a peer UE of the sidelink and may not determine whether to wake up during the wake up period. If the peer UE sends the wake up signal when the monitoring resource of the wake up signal is occupied, the wake up signal may not detected by the receiver UE and the receiver UE does not wake up in the wake up period in the DRX cycle. When the peer UE sends data in the wake up period, the receiver UE may not receive the data, which results in a data loss.

The wake up signal may be used for the UE to wake up in the wake up period within one or more DRX cycles, and there is one or more wake up periods within one DRX cycle.

The wake up period corresponding to the wake up signal may be the wake up period within the DRX cycle adjacent and after the wake up signal.

Therefore, when the monitoring resource of the wake up signal of the sidelink is occupied, the UE wakes up in the wake up period of the DRX cycle corresponding to the wake up signal. The communication channel of the sidelink is monitored in the wake up period. In this way, a problem of the data loss caused by an inability to monitor the wake up signal and an inability to wake up during the wake up period to monitor the channel may be reduced, and a reliability of the data transmission may be improved.

In one embodiment, the signal monitoring resource of the wake up signal of the sidelink being occupied includes at least one of:

the signal monitoring resource of the wake up signal is occupied due to an uplink transmission resource of a Uu interface;

the signal monitoring resource of the wake up signal is occupied due to a bandwidth part (BWP) switching interrupt;

the signal monitoring resource of the wake up signal is occupied due to a measurement resource used for a wireless signal measurement.

Monitoring of the wake up signal and the uplink transmission on the Uu interface occupy the frequency-domain resource in a TDD manner. The uplink transmission resource on the Uu interface occupies the signal monitoring resource of the wake up signal, which may be part of the signal monitoring resource or all the signal monitoring resource of the wake up signal.

The duration of the uplink transmission on the Uu interface covers all or part of a monitoring duration of the wake up signal. Since the uplink transmission on the Uu interface and the monitoring of wake signal adopt a same frequency domain resource, the UE may not monitor the wake up signal, and there is a possibility of missing the wake up signal. Therefore, the UE may wake up during the on duration period of the DRX cycle corresponding to the wake up signal to perform a channel monitoring. Therefore, the problem of the data loss caused by an inability to monitor the wake up signal and an inability to wake up during the wake up period to monitor the channel may be reduced, and the reliability of data transmission may be improved.

If the UE switches from a current working BWP to another BWP, the UE needs to reconfigure radio frequency parameters, resulting in a certain radio frequency interruption period. During the radio frequency interruption period of the BWP switching, the UE may not monitor the wake up signal. The radio frequency interruption period of the BWP switching may cover all or part of the monitoring duration of the wake up signal. In the overlapping part of the radio frequency interruption period of the BWP switching and the monitoring duration of the wake up signal, the UE may not monitor the wake up signal, so it is possible to miss the wake up signal. Therefore, the UE may wake up during the on duration period of the DRX period corresponding to the wake up signal to perform the channel monitoring. Therefore, the problem of the data loss caused by an inability to monitor the wake up signal and an inability to wake up during the wake up period to monitor the channel may be reduced, and the reliability of the data transmission may be improved.

The UE will measure a wireless signal of the Uu interface. The duration of measuring the wireless signal by the UE is called a measurement interval. During the measurement interval, the UE may not receive the data signal, that is, the UE may not monitor the wake up signal. The measurement interval may cover all or part of the monitoring duration of the wake up signal. In the overlapping part of the measurement interval and the monitoring duration of the wake up signal, it is possible to miss the wake up signal. Therefore, the UE may wake up during the wake up period of the DRX period corresponding to the wake up signal to perform the channel monitoring. Therefore, the problem of the data loss caused by an inability to monitor the wake up signal and an inability to wake up during the wake up period to monitor the channel may be reduced, and the reliability of the data transmission may be improved.

In one embodiment, the UE wakes up within the wake up period of the discontinuous reception (DRX) cycle corresponding to the wake up signal whose signal monitoring resource is occupied and the method includes the following steps.

A second wake up timer in the DRX cycle corresponding to the wake up signal whose signal monitoring resource is occupied is started.

The UE wakes up within a timing duration of the second wake up timer.

Here, the wake up period may be the timing duration of the wake up timer in the DRX cycle, within which the UE may wake up and monitor the communication channel of the sidelink. The first wake up timer and the second wake up timer may be a same timer or different timers.

A specific example is provided below in conjunction with any of the above embodiments.

When all or part of the monitoring position of the wake up signal of the sidelink overlaps with the uplink transmission on the Uu interface or a BWP switching interruption duration or the measurement interval, the UE starts the wake up timer in the next DRX cycle.

When the wake up timer or the inactivity timer times out, the UE starts the timer in the following cases, and continues to monitor the PSSCH and the PSCCH during the operation of the timer.

Within run time of the wake up timer or the inactivity timer, the UE always performs the uplink transmission on the Uu interface or is in measurement interval, without monitoring the PSCCH and the PDCCH.

In a period of time before the wake up timer or the inactivity timer times out, the UE always performs the uplink transmission on the Uu interface or is in measurement interval, without monitoring the PSCCH and the PDCCH. The length of a period of time is configured to the UE via the RRC signaling or the RRC signaling of the sidelink.

During the operation of the wake up timer or the inactivity timer, the proportion of the duration of the uplink transmission on the Uu interface by the UE or the measurement interval to the wake up time exceeds a certain threshold. The proportional threshold is configured to the UE via the RRC signaling or the RRC signaling of the sidelink.

The timer may be the inactivity timer or other configured timers, and the timer may be configured to the UE via the RRC signaling or the RRC signaling of the sidelink.

Figure 5:
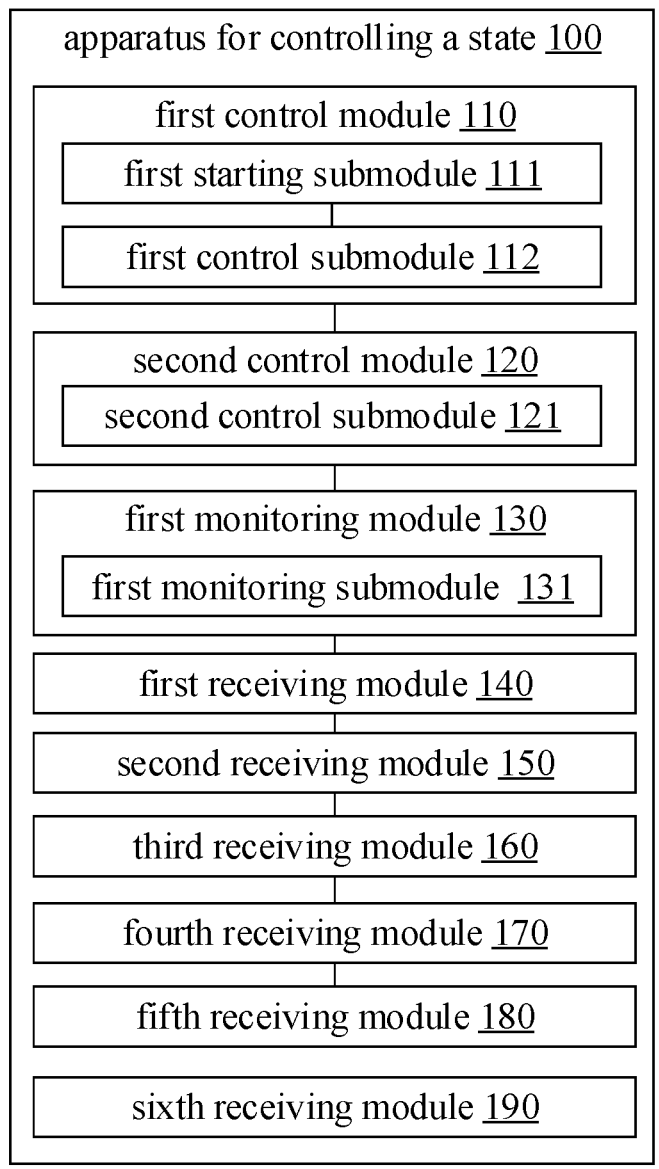
FIG. 5 is a block diagram illustrating an apparatus for controlling a state according to an embodiment.

An apparatus for controlling a state is further provided in an embodiment of the present disclosure, which is applied to a UE. FIG. 5 is a schematic diagram of composition structures of an apparatus 100 for controlling a state according to an embodiment. As shown in FIG. 5, the apparatus 100 includes a first control module 110.

The first control module 110 is configured to wake up within a wake up period of a discontinuous reception (DRX) cycle corresponding to a wake up signal whose signal monitoring resource is occupied, in response to the signal monitoring resource of the wake up signal of a sidelink being occupied.

In one embodiment, the signal monitoring resource of the wake up signal of the sidelink being occupied includes at least one of:

the signal monitoring resource of the wake up signal is occupied due to an uplink transmission resource of a Uu interface;

the signal monitoring resource of the wake up signal is occupied due to a bandwidth part (BWP) switching interruption; or the signal monitoring resource of the wake up signal is occupied due to a measurement resource used for a wireless signal measurement.

In one embodiment, the first control module 110 includes a first starting submodule 111 and a first control submodule 112.

The first starting submodule 111 is configured to start a first wake up timer in the DRX cycle corresponding to the wake up signal whose signal monitoring resource is occupied.

The first control submodule 112 is configured to wake up within a timing duration of the first wake up timer.

In one embodiment, the apparatus 100 further includes a second control module 120 and a first monitoring module 130.

The second control module 120 is configured to set a monitoring timer in a sleep period, in response to a channel monitoring resource of a communication channel of the sidelink is occupied.

The first monitoring module 130 is configured to wake up within a timing duration of the monitoring timer, and monitor the communication channel of the sidelink.

In one embodiment, the second control module 120 includes a second control submodule 121.

The second control submodule 121 is configured to set the monitoring timer in the sleep period, in response to a channel monitoring resource of the communication channel of the sidelink being occupied within a timing duration of a second wake up timer located before and adjacent to the sleep period, or within the timing duration of an inactivity timer located before and adjacent to the sleep period.

In one embodiment, the channel monitoring resource of the communication channel of the sidelink is occupied within the timing duration of the second wake up timer located before and adjacent to the sleep period, or within the timing duration of the inactivity timer located before and adjacent to the sleep period and the method includes:

all the channel monitoring resource or part of the channel monitoring resource within the timing duration of the second wake up timer is occupied due to an uplink transmission on a Uu interface or a wireless signal measurement; or all the channel monitoring resource or part of the channel monitoring resource within the timing duration of the inactivity timer is occupied due to the uplink transmission on the Uu interface or the wireless signal measurement.

In one embodiment, part of the channel monitoring resource within the timing duration of the second wake up timer is occupied due to the uplink transmission on the Uu interface or the wireless signal measurement and the method includes:

the channel monitoring resource within a first duration before a timing end moment of the second wake up timer is occupied due to the uplink transmission on the Uu interface or the wireless signal measurement; and/or the channel monitoring resource with a time domain width in the timing duration of the second wake up timer is occupied due to the uplink transmission or the wireless signal measurement of the Uu interface, in which a proportion of the time domain width to the timing duration of the second wake up timer is greater than a proportional threshold;

in which part of the channel monitoring resource within the timing duration of the inactivity timer being occupied due to the uplink transmission on the Uu interface or the wireless signal measurement includes:

the channel monitoring resource within a first duration before a timing end moment of the inactivity timer is occupied due to the uplink transmission on the Uu interface or the wireless signal measurement;

and/or the channel monitoring resource with the time domain width in the timing duration of the inactivity timer is occupied due to the uplink transmission on the Uu interface or the wireless signal measurement, in which the proportion of the time domain width to the timing duration of the inactivity timer is greater than the proportional threshold.

In one embodiment, the apparatus 100 further includes at least one of a first receiving module 140, a second receiving module 150, a third receiving module 160 or a fourth receiving module 170.

The first receiving module 140 is configured to receive a radio resource control (RRC) signaling of the Uu interface carrying indication information indicating the first duration.

The second receiving module 150 is configured to receive a RRC signaling of the sidelink carrying indication information indicating the first duration.

The third receiving module 160 is configured to receive the RRC signaling of the Uu interface carrying indication information indicating the proportion threshold.

The fourth receiving module 170 is configured to receive the RRC signaling of the sidelink carrying indication information indicating the proportion threshold.

In one embodiment, the monitoring timer includes the inactivity timer.

In one embodiment, the apparatus 100 further includes at least one of a fifth receiving module 180 or a sixth receiving module 190.

The fifth receiving module 180 is configured to receive the RRC signaling of the Uu interface carrying an indication indicating a configuration for the monitoring timer.

The sixth receiving module 190 is configured to receive the RRC signaling of the sidelink carrying the indication indicating the configuration for the monitoring timer.

In one embodiment, the first monitoring module 130 includes a first monitoring submodule 131.

The first monitoring submodule 131 is configured to set the monitoring timer at the start moment of the sleep period.

Figure 6:
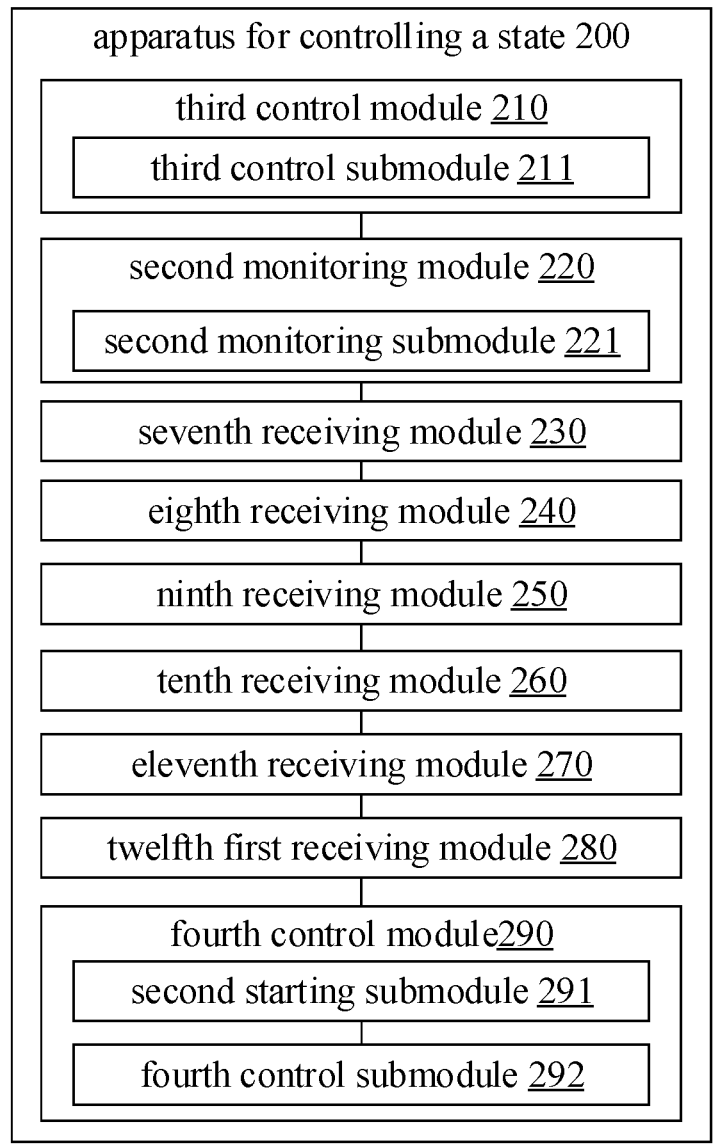
FIG. 6 is a block diagram illustrating an apparatus for controlling a state according to another embodiment.

An apparatus for controlling a state is further provided in an embodiment of the present disclosure, which is applied to a UE. FIG. 6 is a schematic diagram of composition structures of an apparatus 200 for controlling a state according to an embodiment. As shown in FIG. 6, the apparatus 200 includes a third control module 210 and a second monitoring module 220.

The third control module 210 is configured to set a monitoring timer in a sleep period, in response to a channel monitoring resource of a communication channel of a sidelink being occupied.

The second monitoring module 220 is configured to wake up within a timing duration of the monitoring timer, and monitor the communication channel of the sidelink.

In one embodiment, the third control module 210 includes a third control submodule 211.

The third control submodule 211 is configured to set the monitoring timer in the sleep period, the channel monitoring resource of the communication channel of the sidelink being occupied in response to being within the timing duration of a first wake up timer located before and adjacent to the sleep period, or within the timing duration of an inactivity timer located before and adjacent to the sleep period.

In one embodiment, the channel monitoring resource of the communication channel of the sidelink being occupied within the timing duration of the first wake up timer located before and adjacent to the sleep period, or within the timing duration of the inactivity timer located before and adjacent to the sleep period and the method includes:

all the channel monitoring resource or part of the channel monitoring resource within the timing duration of the first wake up timer is occupied due to an uplink transmission on a Uu interface or a wireless signal measurement;

or, all the channel monitoring resource or part of the channel monitoring resource within the timing duration of the inactivity timer is occupied due to the uplink transmission on the Uu interface or the wireless signal measurement.

In one embodiment, part of the channel monitoring resource within the timing duration of the first wake up timer being occupied due to the uplink transmission or the wireless signal measurement of the Uu interface includes:

the channel monitoring resource within a first duration before a timing end moment of the first wake up timer is occupied due to the uplink transmission or the wireless signal measurement of the Uu interface;

and/or, the channel monitoring resource with a time domain width in the timing duration of the first wake up timer is occupied due to the uplink transmission or the wireless signal measurement of the Uu interface, in which a proportion of the time domain width to the timing duration of the first wake up timer is greater than a proportional threshold;

in which part of the channel monitoring resource within the timing duration of the inactivity timer being occupied due to the uplink transmission on the Uu interface or the wireless signal measurement includes:

the channel monitoring resource within the first duration before the timing end moment of the inactivity timer is occupied due to the uplink transmission on the Uu interface or the wireless signal measurement;

and/or the channel monitoring resource with the time domain width in the timing duration of the inactivity timer is occupied due to the uplink transmission on the Uu interface or the wireless signal measurement, in which the proportion of the time domain width to the timing duration of the inactivity timer is greater than the proportional threshold.

In one embodiment, the apparatus 200 further includes at least one of a seventh receiving module 230, an eighth receiving module 240, a ninth receiving module 250 or a tenth receiving module 260.

The seventh receiving module 230 is configured to receive a radio resource control (RRC) signaling of the Uu interface carrying indication information indicating the first duration.

The eighth receiving module 240 is configured to receive a RRC signaling of the sidelink carrying indication information indicating the first duration.

The ninth receiving module 250 is configured to receive the RRC signaling of the Uu interface carrying indication information indicating the proportion threshold.

The tenth receiving module is configured to receive the sidelink RRC of the sidelink carrying indication information indicating the proportion threshold.

In one embodiment, the monitoring timer includes the inactivity timer.

In one embodiment, the apparatus further includes at least one of an eleventh receiving module 270 or a twelfth first receiving module 280.

The eleventh receiving module 270 is configured to receive the RRC signaling of the Uu interface carrying an indication indicating a configuration for the monitoring timer.

The twelfth first receiving module 280 is configured to receive the RRC signaling of the sidelink carrying the indication indicating a configuration for the monitoring timer configuration.

In one embodiment, the second monitoring module 220 includes:

a second monitoring submodule 221, configured to set the monitoring timer at the start moment of the sleep period.

In one embodiment, the apparatus 200 further includes a fourth control module 290.

The fourth control module 290 is configured to wake up within the wake up period of a discontinuous reception (DRX) cycle corresponding to a wake up signal whose signal monitoring resource is occupied, in response to the signal monitoring resource of the wake up signal of a sidelink being occupied.

In one embodiment, the signal monitoring resource of the wake up signal of a sidelink being occupied includes at least one of:

the signal monitoring resource of the wake up signal is occupied due to an uplink transmission resource of a Uu interface;

the signal monitoring resource of the wake up signal is occupied due to a bandwidth part (BWP) switching interrupt; or the signal monitoring resource of the wake up signal is occupied due to a measurement resource used for the wireless signal measurement.

In one embodiment, the fourth control module 290 includes a second starting submodule 291 and a fourth control submodule 292.

The second starting submodule 291 is configured to start a second wake up timer in the DRX cycle corresponding to the wake up signal whose signal monitoring resource is occupied.

The fourth control submodule 292 is configured to wake up within a timing duration of the second wake up timer.

In embodiments, the first control module 110, the second control module 120, the first monitoring module 130, the first receiving module 140, the second receiving module 150, the third receiving module 160, the fourth receiving module 170, the fifth receiving module 180, the sixth receiving module 190, the third control module 210, the second monitoring module 220, the seventh receiving module 230, the eighth receiving module 240, the ninth receiving module 250, the tenth receiving module 260, the eleventh receiving module 270, the twelfth receiving module 280, the fourth control module 290 and the like may be implemented by one or more CPU (central processing unit), GPU (graphics processing unit), BP (baseband processor), ASIC (application specific integrated circuit), DSP, PLD (programmable logic device), CPLD (complex programmable logic device), FPGA (field-programmable gate array), general-purpose processor, controller, MCU (micro controller unit), microprocessor, or other electronic components. It can also be implemented in combination with one or more radio frequency (RF) antennas to perform the aforementioned method.

Figure 7:
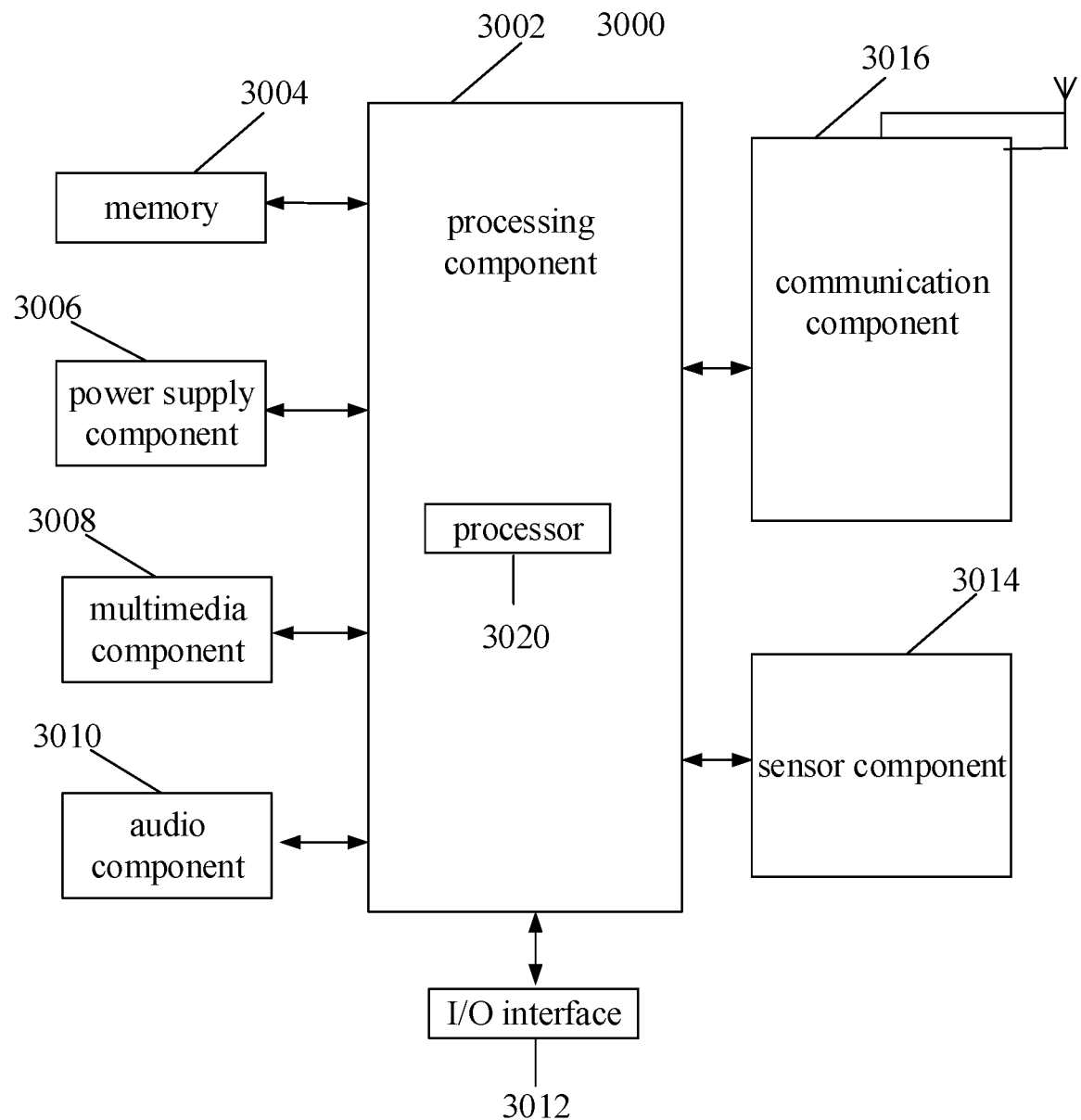
FIG. 7 is a block diagram illustrating a device for controlling a state according to an embodiment.

FIG. 7 is a block diagram illustrating a device 3000 for controlling a state according to an embodiment. For example, a device 3000 may be a mobile phone, a computer, a digital broadcasting terminal, a messaging device, a game console, a tablet device, a medical equipment, a fitness equipment, a personal digital assistant, etc.

Referring to FIG. 7, the device 3000 may include one or more components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the device 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the device 3000. Examples of the data include the instructions of any applications or methods operated on the device 3000, contact data, phone book data, messages, pictures, videos, etc. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 may provide power supply for all components of the device 3000. The power supply component 3006 may include power supply management system, one or more power supplies, and other units related to generating, managing and distributing power for the device 3000.

The multimedia component 3008 includes an output interface screen provided between the device 3000 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 3008 includes a front camera and/or a rear camera. When the device 3000 is in operation mode, such as shooting mode or video mode, the front camera or the rear camera may receive the external multimedia data. Each front camera and rear camera may be a fixed optical lens system or an optical lens system with focal length and optical zoom capacity.

The audio component 3010 is configured as an output and/or input signal. For example, the audio component 3010 includes a microphone (MIC). When the device 3000 is in operation mode, such as call mode, record mode, and speech recognition mode, the microphone is configured to receive the external audio signals. The audio signals received may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of status assessment for the device 3000. For example, the sensor component 3014 may detect the on/off state of the device 3000 and the relative positioning of the component. For example, the component is a display and a keypad of the device 3000. The sensor component 3014 may further detect the location change of the device 3000 or one component of the device 3000, the presence or absence of contact between the user and the device 3000, the orientation or acceleration/deceleration of the device 3000, and the temperature change of the device 3000. The sensor component 3014 may include a proximity sensor, which is configured to detect the existence of the objects nearby without any physical contact. The sensor component 3014 may further include a light sensor such as CMOS or CCD image sensor, which is configured to use in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the device 3000 and other devices. The apparatus 3000 may access wireless networks based on communication standard, such as WiFi, 2G or 3G, or their combination. In an embodiment, the communication component 3016 receives broadcast signals or broadcast-related information from an external broadcast management system via a broadcast channel. In an embodiment, the communication component 3016 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an embodiment, the device 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an embodiment, a non-temporary computer readable storage medium is further provided which includes instructions, such as the memory 3004 including instructions. The instructions may be executed by the processor 3020 of the device 3000 to complete the above methods. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think in an embodiment of other implementations. The present application is intended to cover any variations, usages, or adaptive changes of the present disclosure. These variations, usages, in an embodiment or adaptive changes follow the general principles of the present disclosure and include common knowledge or conventional technical means in the technical field in an embodiment not disclosed by the present disclosure. The description and the embodiments are to be regarded as exemplary only, and in an embodiment the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims.

What is claimed is:

1. A method for controlling a state, comprising:
waking up within a wake up period of a discontinuous reception (DRX) cycle corresponding to a wake up signal whose signal monitoring resource is occupied in absence of detecting the wake-up signal, in response to determining that the signal monitoring resource of the wake up signal of a sidelink is occupied;
setting a monitoring timer in a sleep period, in response to determining that a channel monitoring resource of a communication channel of the sidelink is occupied so that a user equipment (UE) is unable to receive data during the wake up period; and
waking up within a timing duration of the monitoring timer within the sleep period, and monitoring the communication channel of the sidelink to receive data retransmitted during the sleep period.

2. The method of claim 1, wherein the signal monitoring resource of the wake up signal of a sidelink is occupied comprises at least one of following acts:
occupying the signal monitoring resource of the wake up signal due to an uplink transmission resource of a Uu interface;
occupying the signal monitoring resource of the wake up signal due to a bandwidth part (BWP) switching interruption; or
occupying the signal monitoring resource of the wake up signal due to a measurement resource used for a wireless signal measurement.

3. The method of claim 1, wherein waking up within the DRX cycle corresponding to the wake up signal whose signal monitoring resource is occupied comprises:
starting a first wake up timer in the DRX cycle corresponding to the wake up signal whose signal monitoring resource is occupied; and
waking up within a timing duration of the first wake up timer.

4. The method of claim 1, wherein setting the monitoring timer in the sleep period, in response to determining that the channel monitoring resource of the communication channel of the sidelink is occupied comprises:
setting the monitoring timer in the sleep period, in response to determining that a channel monitoring resource of the communication channel of the sidelink is occupied within a timing duration of a second wake up timer located before and adjacent to the sleep period, or within a timing duration of an inactivity timer located before and adjacent to the sleep period.

5. The method of claim 4, wherein the channel monitoring resource of the communication channel of the sidelink is occupied within the timing duration of the second wake up timer located before and adjacent to the sleep period, or within the timing duration of the inactivity timer located before and adjacent to the sleep period comprises:
occupying all the channel monitoring resource or part of the channel monitoring resource within the timing duration of the second wake up timer due to an uplink transmission on a Uu interface or a wireless signal measurement;
or
occupying all the channel monitoring resource or part of the channel monitoring resource within the timing duration of the inactivity timer due to the uplink transmission or the wireless signal measurement of the Uu interface.

6. The method of claim 5, wherein occupying part of the channel monitoring resource within the timing duration of the second wake up timer due to the uplink transmission on the Uu interface or the wireless signal measurement comprises at least one of:
occupying the channel monitoring resource within a first duration before a timing end moment of the second wake up timer due to the uplink transmission or the wireless signal measurement of the Uu interface;
or
occupying the channel monitoring resource with a time domain width in the timing duration of the second wake up timer due to the uplink transmission or the wireless signal measurement of the Uu interface, wherein a proportion of the time domain width to the timing duration of the second wake up timer is greater than a proportional threshold;

occupying part of the channel monitoring resource within the timing duration of the inactivity timer due to the uplink transmission on the Uu interface or the wireless signal measurement comprises at least one of:
occupying the channel monitoring resource within a first duration before a timing end moment of the inactivity timer due to the uplink transmission or the wireless signal measurement of the Uu interface;
or
occupying the channel monitoring resource with a time domain width in the timing duration of the inactivity timer due to the uplink transmission on the Uu interface or the wireless signal measurement, wherein a proportion of the time domain width to the timing duration of the inactivity timer is greater than a proportional threshold.

7. The method of claim 6, further comprising at least one of following steps:
receiving a radio resource control (RRC) signaling of the Uu interface carrying indication information indicating the first duration;
receiving a RRC signaling of the sidelink carrying indication information indicating the first duration;
receiving the RRC signaling of the Uu interface carrying indication information indicating the proportion threshold; or
receiving the RRC signaling of the sidelink carrying indication information indicating the proportion threshold.

8. The method of claim 1, wherein the monitoring timer comprises an inactivity timer.

9. The method of claim 8, further comprising at least one of following steps:
receiving the RRC signaling of the Uu interface carrying an indication indicating a configuration for the monitoring timer; or
receiving the RRC signaling of the sidelink carrying the indication indicating the configuration for the monitoring timer.

10. The method of claim 1, wherein setting the monitoring timer in the sleep period comprises:
setting the monitoring timer at the start moment of the sleep period.

11. A communication device, comprising a processor, a transceiver, a memory and an executable program stored in the memory and capable of running by the processor, when the processor executes the executable program, the processor is configured to:
wake up within a wake up period of a discontinuous reception (DRX) cycle corresponding to a wake up signal whose signal monitoring resource is occupied in absence of detecting the wake-up signal, in response to determining that the signal monitoring resource of the wake up signal of a sidelink is occupied;
set a monitoring timer in a sleep period, in response to determining that a channel monitoring resource of a communication channel of the sidelink is occupied so that a user equipment (UE) being unable to receive data during the wake-up period; and
wake up within a timing duration of the monitoring timer within the sleep period, and monitoring the communication channel of the sidelink to receive data retransmitted during the sleep period.

* * * * *